United States Patent [19]  [11]  4,132,940
Schindler  [45]  Jan. 2, 1979

[54] APPARATUS FOR PROVIDING A SERVO DRIVE SIGNAL IN A HIGH-SPEED STEPPING INTERFEROMETER

[76] Inventors: James C. Fletcher, Administrator of the National Aeronautics and Space Administration, with respect to an invention of Rudolf A. Schindler, Sierra Madre, Calif.

[21] Appl. No.: 804,035

[22] Filed: Jun. 6, 1977

Related U.S. Application Data

[63] Continuation of Ser. No. 565,162, Apr. 4, 1975, abandoned.

[51] Int. Cl.$^2$ ............................................. G05B 1/06
[52] U.S. Cl. ................................. 318/640; 318/573; 318/594
[58] Field of Search ...................... 318/640, 573, 594; 364/607, 858; 307/227, 261; 328/184; 356/106 R, 106 S

[56] References Cited

U.S. PATENT DOCUMENTS

| | | | |
|---|---|---|---|
| 3,588,254 | 6/1971 | Rhoades | 356/106 R |
| 3,789,391 | 1/1974 | Brock et al. | 318/594 |
| 3,943,342 | 3/1976 | May et al. | 318/594 |

Primary Examiner—Robert K. Schaefer
Assistant Examiner—Eugene S. Indyk
Attorney, Agent, or Firm—Monte F. Mott; John R. Manning; Paul F. McCaul

[57] ABSTRACT

In infrared spectroscopy utilizing an interferometer, position stepping of the optical path difference in the interferometer must be accomplished quite rapidly in response to a drive signal applied to a moveable mirror in the interferometer which is proportional to the offset distance desired from the previous null point. As the mirror moves in response to this drive signal, effectively getting closer to the new null point, the drive signal is gradually reduced, in response to detected reference laser fringes. At the new null position, the drive signal will effectively be zero. A binary up/down counter drives a digital/analog converter (DAC). The output from the DAC is supplied to the mirror moving means. The fringes generated by a reference laser are detected as the mirror moves, causing the up/down counter to be decremented to its null count, thereby reducing the output of the DAC, as the mirror moves towards its new null position. Undesirable movement of the mirror due to vibration or other sources causes the up/down counter to be incremented away from its null count, thereby causing a correcting drive signal to be applied to the mirror moving means that is proportional to the distance of movement.

8 Claims, 6 Drawing Figures

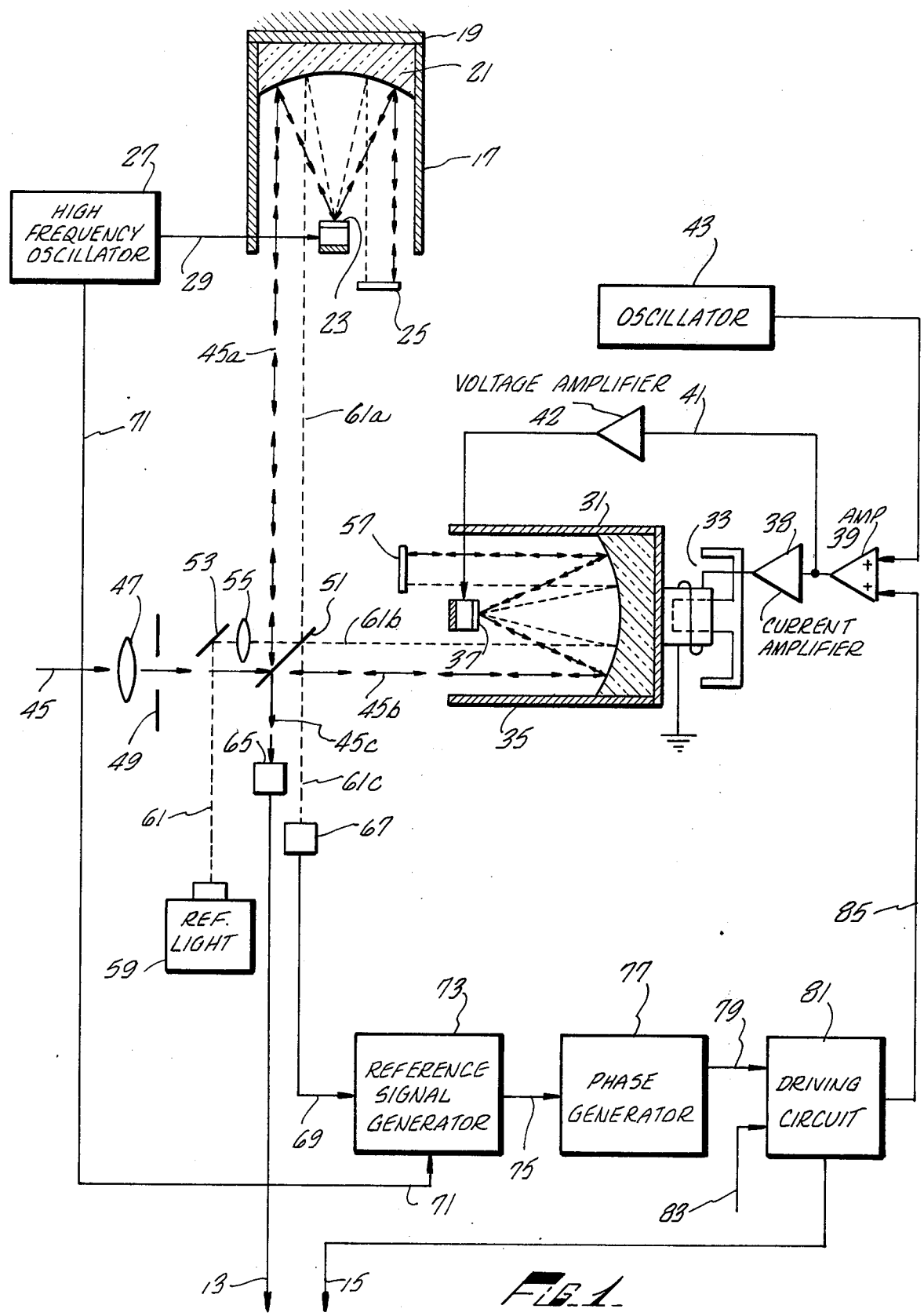

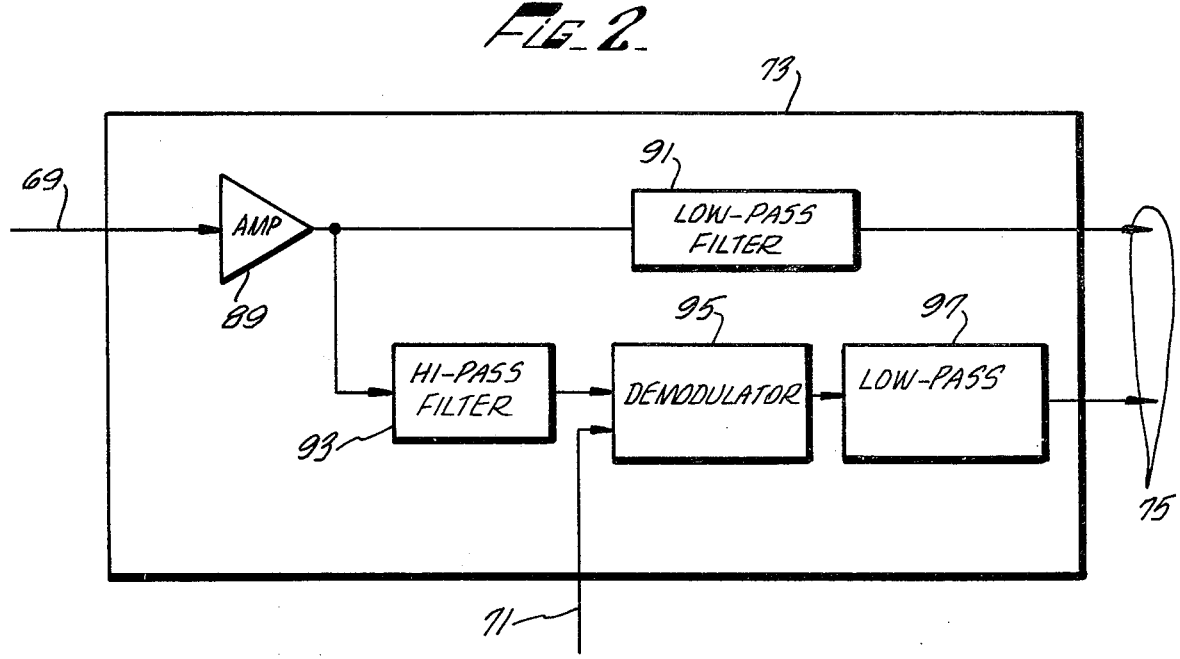
FIG_2.
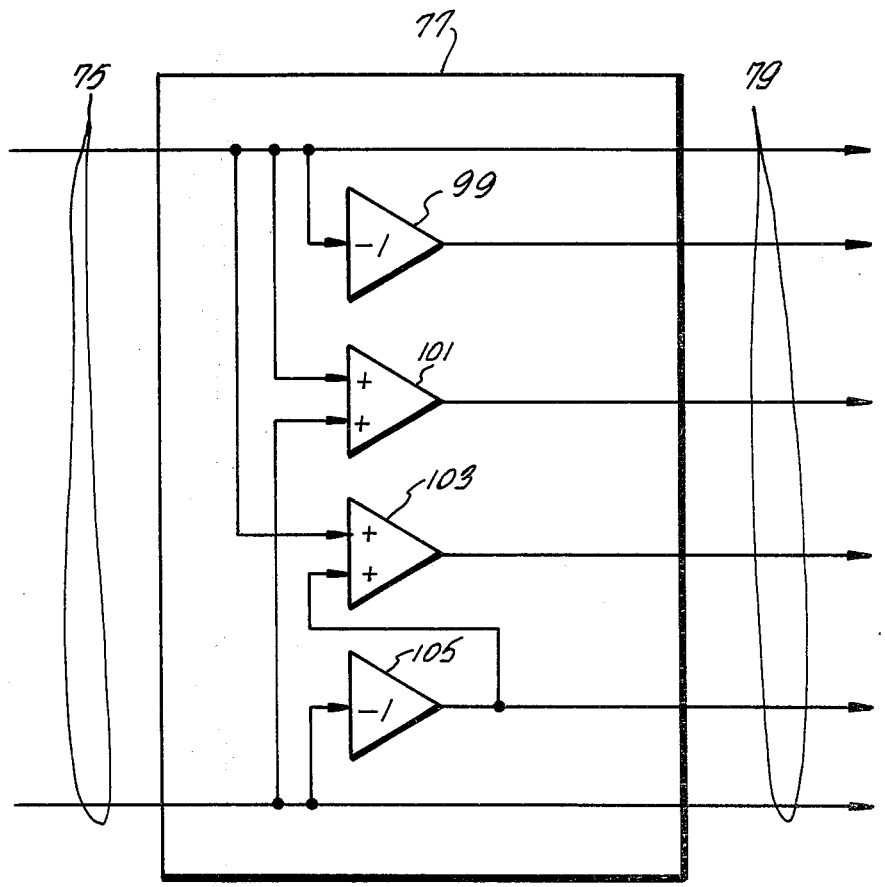
FIG_3.

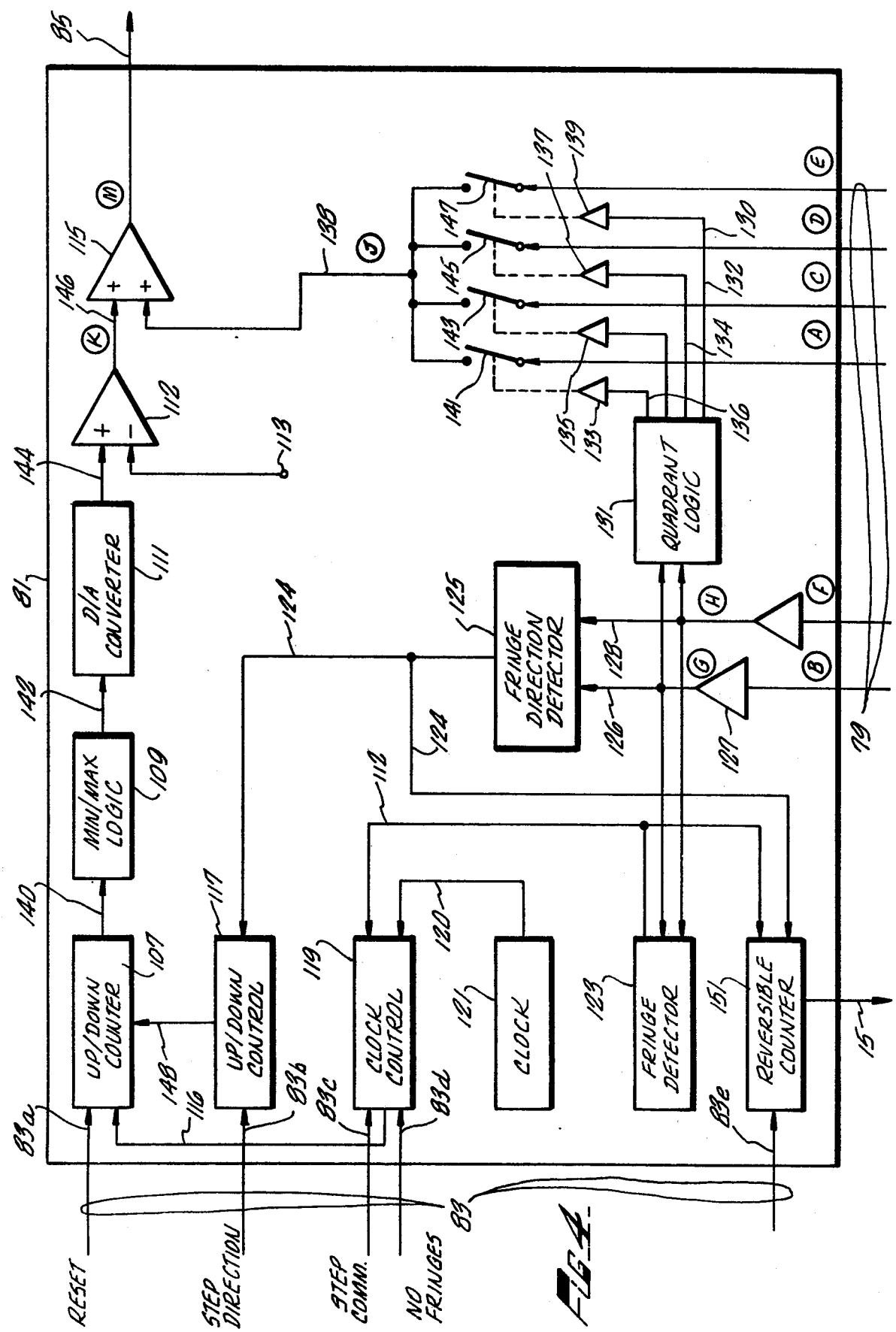

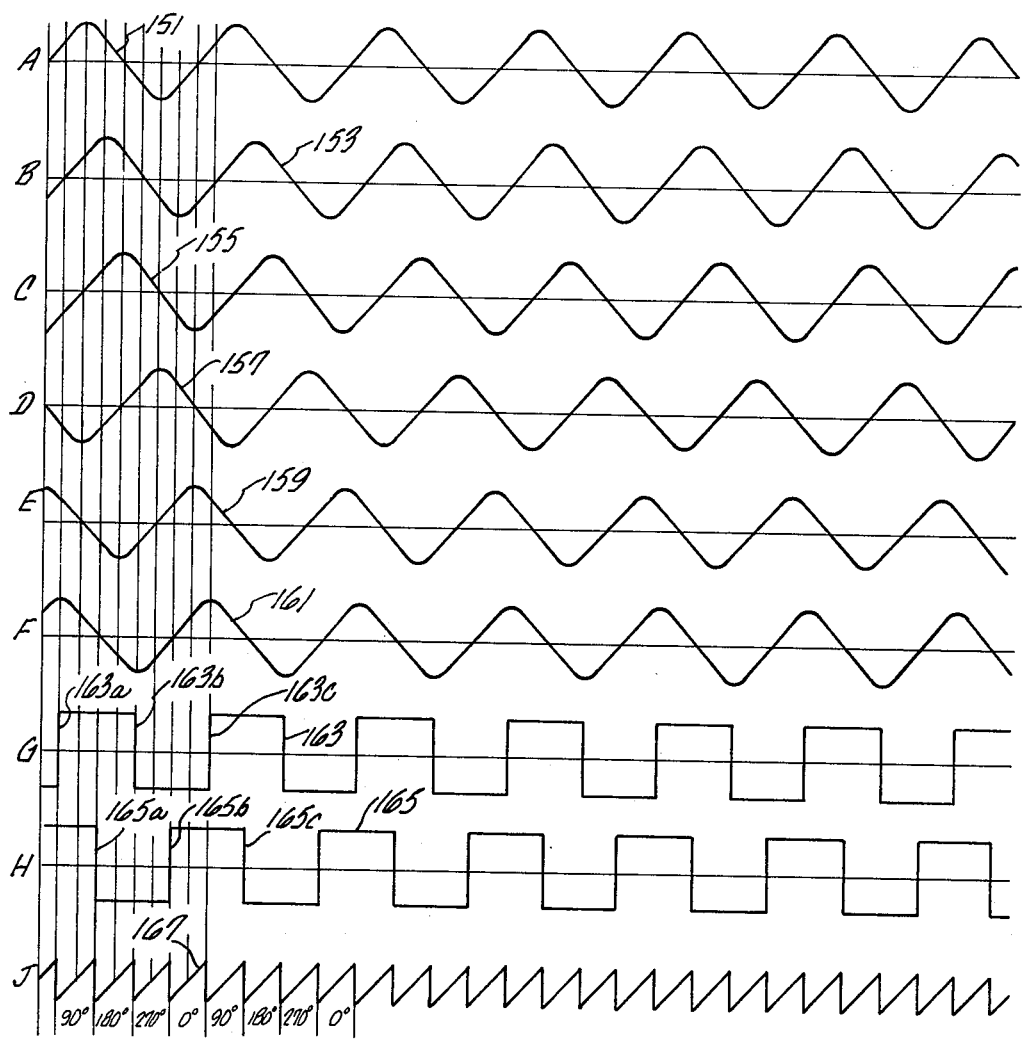
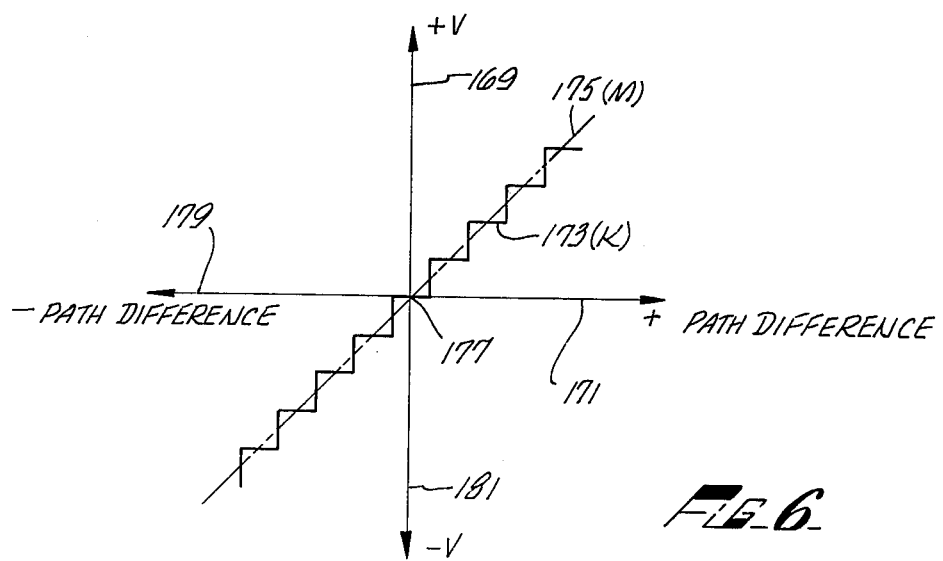
FIG. 5
FIG. 6

APPARATUS FOR PROVIDING A SERVO DRIVE SIGNAL IN A HIGH-SPEED STEPPING INTERFEROMETER

ORIGIN OF THE INVENTION

The invention described herein was made in the performance of work under a NASA contract and is subject to the provisions of Section 305 of the National Aeronautics and Space Act of 1958, Public law 85-568 (72 Statute 435: 42 USC 2457).

This case is a continuation of Ser. No. 565,162, filed Apr. 4, 1975, now abandoned.

BACKGROUND OF THE INVENTION

This invention relates to interferometers and more particularly to the stepping of the optical path difference in an interferometer.

Interferometers are instruments which can be used to measure a linear distance with great accuracy or, to measure the wavelength of radiation with great accuracy. The Michaelson interferometer is a well known type of interferometer which splits the incoming light beam into two beam portions by means of a semi-reflecting surface so that the two portions can travel over two different paths. It then recombines the two beam portions after they have been reflected by separate plane mirrors to produce fringes. Proper operation of the basic Michaelson interferometer requires that the alignment of the plane mirrors be maintained to within approximately a second of arc. This alignment is difficult to maintain when one of the mirrors is moved along the normal to the mirror surface, which is the case in most interferometers.

An improved interferometer utilizes cube-corner reflectors in place of the plane mirrors in order to return the beams in a direction parallel to their directions of incidence. Such devices are referred to as retro-reflectors. The cube-corner retro-reflector returns the beam in precisely the same direction as the incoming beam in spite of slight angular misalignments. However, difficulty is encountered in producing cube-corner retro-reflectors because the three perpendicular plane mirrors comprising the cube-corner must be perpendicular within a second of arc.

Another type of retro-reflector used in interferometers is a "cat's eye" retro-reflector. The cat's eye consists of a parabolic primary mirror and a flat secondary mirror positioned at the focus of the primary mirror. The cat's eye retro-reflector has the advantage of the cube reflector in that it is tolerant to moderate misalignment and has the further advantage that it is much easier to manufacture.

With the advent of cat's eye retro-reflectors, the use of interferometers under non-laboratory conditions became possible. However, in non-laboratory environments, the interferometer is subject to vibrations that could seriously degrade its performance. The affects of low-frequency vibrations can be compensated for by a servosystem which moves one of the cat's eye retro-reflectors or corner-cube retro-reflectors back and forth so as to maintain a predetermined optical path difference. This predetermined optical path difference is charted by a separate visible monochromatic light beam such as is generated by a laser. The laser beam produces interference fringes having amplitudes that vary sinusoidally as one of the retro-reflectors is moved. The servo nulls (produces no error correcting signal) on a particular portion of the sinusoid, for instance the trough. Such an interferometer is described in an article printed in Applied Optics, Volume 9, page 301 on February, 1970.

The prior art servosystem for changing the optical path difference between the two cat's eye retro-reflectors, as described, for example, in U.S. Pat. No. 3,535,024, take the form of a dual-mode control system. This type of control system steps the optical path difference from one null position to another in the open loop mode and utilizes the interference fringes generated by the reference light beam as the error signal in the closed loop mode for nulling the movement of the retro-reflector as it approaches the next fringe area. Thus, as explained in U.S. Pat. No. 3,535,024, the optical path difference is stepped along by the use of open-loop signals which nudge the mirror mechanism to the next fringe area, the voltage utilized for this nudging action being sufficient to move the retro-reflector a certain distance to the next null area. Upon anticipating the approach of the null area, a closed-loop error voltage is generated by the reference interference pattern. This error voltage is utilized to maintain that null position during the time a reading is taken.

This type of interferometer control mechanism is not satisfactory for the purpose of stepping the optical path difference of a fourier interference spectrometer at the high speeds required by certain applications. In addition, this type of prior art servo control inherently limits the internal modulation that may be utilized to $\frac{1}{8}$ the wavelength of the reference light source, thereby severely limiting the interferometer's usefulness in the analysis of certain radiation.

Internal modulation in interferometers is a well known method of modulating the radiation to be analyzed. The optical path difference in the interferometer is modulated by an amount which, optimally, equals one-half the wavelength of the radiation to be analyzed. After detection, the modulated signal is phasesensitively demodulated before further signal processing. This process reduces the effects of atmospheric and 1/f noise.

OBJECTS AND SUMMARY OF THE INVENTION

An object of this invention is to provide an interferometer step controller that permits high stepping speeds.

A further object of this invention is to provide a closed-loop interferometer step controller.

Another object of this invention is to provide an interferometer step controller that permits a higher amplitude of internal modulation than was heretofore possible.

Yet a further object of this invention is to provide a high speed method of stepping the optical path difference in an interferometer.

Yet another object of this invention is to provide a method of stepping the optical path difference in an interferometer that permits a higher amplitude of internal modulation than was heretofore possible.

These objects and the general purpose of this invention are accomplished in the following manner. An analog voltage approximately linearly proportional to a desired offset from the present null position of the moving mirror in the interferometer is applied to the mirror moving means. As the mirror moves to the next null position, as determined by the analog voltage, the fringes of the laser reference interference pattern are detected. At the occurrence of each fringe the analog voltage is reduced proportionally so that then the next null position is reached, this driving analog voltage is effectively zero.

A binary up/down counter, by its internal count, causes a digital/analog converter to supply the analog voltage to the mirror moving means. Fringe detector and direction of movement logic cause the binary up/down counter to be decremented from its offset count as the mirror is moved to its new null position. The fringe detector logic causes a count change in the binary counters in response to the fringe pattern of the reference laser beam changing by a portion of the laser wavelength. The digital/analog converter output is summed with a negative voltage to produce a zero voltage when the counter is at a count equal to half its modulo, a negative voltage when the count is less than half its modulo, and a positive voltage when the count is more than lalf its modulo. An analog reference voltage directly related to the reference fringe pattern is added to this voltage to produce a very nearly linearly proportional offset voltage.

BRIEF DESCRIPTION OF THE DRAWINGS

The exact nature of this invention as well as other objects and advantages thereof will be readily apparent from consideration of the following specifications related to the annexed drawings in which like reference numerals designate like parts throughout the figures thereof and wherein:

FIG. 1 is a diagram of an interferometer servosystem according to the present invention;

FIG. 2 is a block diagram of the reference signal generation mechanism of FIG. 1;

FIG. 3 is a block diagram of the phase-generation mechanism of FIG. 1;

FIG. 4 is a block diagram of the servo driving circuit for the interferometer mechanism of FIG. 1;

FIG. 5 is a series of waveforms present in the servo drive circuit of FIG. 4;

FIG. 6 is a voltage versus path difference plot of the output signals from the servo driving circuit of FIG. 4.

DESCRIPTION OF THE PREFERRED EMBODIMENTS

FIG. 1 illustrates an interferometer spectrometer which is used for analyzing radiation 45 having a frequency that may be in the visible or infrared spectrum. The apparatus of FIG. 1 can determine the wavelength of radiation components of various optical frequencies with high precision. Such a determination is made by detecting the amplitude of incident light at a photo detector 65 and measuring the amplitude for various optical path length differences in the interferometer. The components of various frequencies in the radiation 45 are determined by utilizing a Fourier transformation of the output amplitude of the photo detector 65 on line 13 versus optical path difference indicated by a path difference signal on line 15.

Basically, the apparatus includes a beam splitter 51 which allows half of the radiation 45B to pass through to a first retro-reflector 31 and the other half 45A to a second retro-reflector 17. The retro-reflectors return the two beams to the beam splitter 51 and the composite beam 45C resulting from the recombination of the two beams falls on the photo detector 65. The difference in path length for the light beams directed to the retro-reflectors 17 and 31 causes the generation of fringes at the plane of the photo detector 65, the photo detector covering only a small portion of one fringe area.

The radiation 45 to be analyzed passes into the interferometer mechanism of FIG. 1 through a collimator containing a lens 47 and through an aperture in a stop 49 that limits the beam size. The radiation 45 then reaches the beam splitter 51. Typically, the beam splitter is a cube formed by two right-angle prisms, with their hypotenuse surfaces joined, and with a semi-reflecting coating on one of the joined surfaces.

The beam splitter 51 passes approximately 50% of the radiation to allow it to reach the first retro-reflector 31. The other 50% of the radiation is reflected towards the second retro-reflector 17. The radiation 45B which continues towards the first retro-reflector 31 strikes the primary mirror 35, is reflected towards a secondary mirror 37, is again reflected towards the primary mirror 35, and is then reflected to an end mirror 57, which is totally reflective. The end mirror 57 reflects the beam back from where it was received so that it again strikes the primary mirror 35, secondary mirror 37, primary mirror 35 and then the beam splitter 51. The returning radiation beam is reflected downward toward the main photo detector 65.

The portion of the radiation 45 which is initially reflected by the beam splitter 51 towards the second retro-reflector 17 passes toward the primary mirror 21 of the retroreflector and is reflected towards the secondary mirror 23, back towards the primary and then towards the second end mirror 25. The end mirror 25, which is totally reflective, returns the beam over the same path to the beam splitter 51. This beam passes through the beam splitter and is incident on the main photo detector 65. Thus the light incident on the photo detector 65 includes two beam portions which may have a different path length giving rise to fringes on the photo detector surface. The location of the fringes created in the plane of the photo detector effects the output on line 13 of the photo detector.

A determination of the exact difference between the two paths is made by the use of a reference monochromatic light source 59 such as a helium, neon laser or mercury discharge lamp. The light beam 61 from the reference source 59 is projected through the same optical system, in parallel with the radiation 45 to be analyzed, but is laterally displaced from it by some convenient distance. This causes the recombined beam from the reference light source to fall upon another photo detector 67, which is a reference photo detector that also covers a small area.

Changes in the optical path difference generally due to movement of retro-reflector 31 cause the fringe areas of maximum amplitude to pass across the reference photo detector 67. The change of path difference between the appearance of fringe maxima is equal to the wavelength of the monochromatic light source 59. A fringe counter, a part of the driving circuit 81, as will be explained hereinafter, is utilized to count the number of fringes encountered. This makes it possible to determine the precise total optical path difference measured from an arbitrary starting point at which each radiation measurement is made. This information could also be used to control a machine tool or measure distances for example. In the application of an interferometer spectrometer, as is herein illustrated, it is necessary to know the total optical path difference for each point at which the output from the main photo detector 65 is taken. This information is required in order to construct the Fourier transformation of the radiation data (called an interferogram) in a spectral output which indicates the radiation and intensity at each wavelength.

In order to make an interferogram of the radiation 45, the difference in path length for the two beam portions 45A and 45B passing to the retro-reflectors 17 and 31 is repeatedly changed. This can be done by starting the measurement with the first retro-reflector 31 in a position where the path lengths are identical and repeatedly moving the retro-reflector 31 toward the beam splitter 51. In a typical system, the first retro-reflector 31 may be moved 75,000 steps, each step resulting in an increase of path difference of one reference wavelength. A measurement of the output from the main photo detector 65 is taken after each step. In order to make a measurement within a reasonable time, the effective position of the retro-reflector 31 must be changed very rapidly. In some applications a stepping speed of approximately 2,000 steps per second are required.

The difference in path length between the two beams 45A and 45B is monitored by the reference photo detector 67 as above described. In particular the output 61 of the reference light source 59 is reflected by a mirror 53, passes through a collimating lens system indicated at 55, and is split into two beam portions by the beam splitter 51. If the reference light source 59 is a laser, the collimating lens 55 is not required. The two beam portions 61A and 61B undergo the same reflections as the radiation 45 to be analyzed. However, since the reference beam is displaced a distance from the radiation, the interference pattern 61C created thereby can be separately detected by the reference photo detector 67.

The wavelength of the reference beam 61 is knwon with high precision. Accordinly the difference in path lengths for the radiation 45 passing to the two different retro-reflectors 17 and 31 can be known precisely by measuring the fringe occurrences at the reference photo detector 67.

The cat's eye type retro-reflectors 31 and 17 include a large parabolic primary mirror, 35 and 21 respectively, and a small secondary mirror, 37 and 23 respectively, which face the primary mirrors. Rapid changes in the effective position of the moveable retro-reflector 31 can be made because the small secondary mirror 37 is not rigidly mounted on the cat's eye mounting which holds the primary mirror 35. Instead the secondary mirror 37 is mounted on a piezoelectric transducer. The transducer is attached to a spider which is fixed to the mounting. The effective position of the entire first retro-reflector 31 can be changed within a limited range by movement of the secondary mirror 37. This is accomplished by voltages applied to the piezoelectric transducer over lines 41. Since the secondary mirror 37 typically weighs only around 70 mg., its position can be altered rapidly. Where large movements of the retro-reflector 31 are required, the entire retro-reflector can be moved by the primary moving means comprising a moving coil actuator 33 which is attached to the mounting of the retro-reflector 31. Th cat's eye retro-reflector 17 similarly has a primary parabolic mirror 21 and a secondary mirror 23. However, its mounting is fixedly supported 19 and held stationary at all times.

The secondary mirror 23 of the retro-reflector 17 is moved in order to determine the direction of optical path change caused by the movement of retro-reflector 31. A high frequency oscillator 27 generates, for example, a 500KHz signal having an amplitude of 1/100th of one wavelength of the reference light source 61. This signal is supplied to the piezoelectric transducer of the mirror 23 over lines 29. The same frequency signal is supplied over line 71 to a reference signal generation circuit 73, which, as more fully explained hereinafter, generates two 90° displaced signals. The output of the reference photo detector 67 is supplied over line 69 to the reference signal generator 73.

The present invention utilizes the output signals on line 75, from the reference signal genrator circuit 73, to produce in the phase generator circuit 77, and apply to lines 79, four additional phase differentiated signals. These signals are supplied to a driving circuit 81 that also receives command signals on line 83. The driving circuit 81, as will be explained hereinafter, generates signals on line 15 that indicate the optical path difference in the interferometer. The circuit 81 generates voltage driving signals on line 85 for moving the retro-reflector 31. The driving signal voltage on line 85, as will be explained hereinafter, is generated in such a way as to permit internal modulation at a frequency of 10,000 Hz with a peak to peak amplitude of one to five microns to be applied to the interferometer mechanism through the servo circuitry.

The output of an oscillator 43 which generates a 10,000 Hz signal at a peak to peak amplitude of one to five microns is supplied to an amplifier 39 which effectively sums this modulation signal with the driving voltage on line 85, from the driving circuit 81. The low-frequency component of the output signal from the amplifier 39 is supplied to the moving coil mechanism 33 and the transducer of mirror 37, after suitable further amplification by amplifier 38 and 42. The moving frequency component coil mechanism only responds to the low frequency components of the signal while the piezoelectric mechanism connected to the reflecting mirror 37 responds to the high frequency components of the signal.

The purpose of the 10,000 Hz signal from oscillator 43 is to modulate the IR signal to be analyzed. After detection, the IR signal is phase sensitively demodulated with the 10,000 Hz signal. This effectively raises the frequency of the IR signal from tens of Hz to 10,000 Hz ± tens of Hz, in order to reduce 1/f noise and the effect of atmospheric turbulence.

The reference signal generator circuit 73 of FIG. 1 is more specifically illustrated in FIG. 2 as consisting of an amplifier 89 receiving the output of the reference photo detector 67 on line 69. Amplifier 89 supplies the amplified signal to a low-pass filter 91 that provides a low-frequency or average component of the received signal on line 69 which is at a zero degree phase displacement from the received signal. The output of amplifier 89 is also supplied to a higher pass filter 93. The output of filter 93 is delivered to a demodulator 95, along with the output of the high-frequency oscillator 27 on line 71. The demodulator 95 generates a product of the two received signals and supplies that product to a low-pass filter 97 to obtain the low-frequency or average component of this product signal. This average component is 90° displaced from the component signal received from the other low-pass filter 91. Both the 0° component and the 90° component will be constant for a given position of the moveable retro-reflector 31. A more complete explanation of the theory of operation and structural requirements for the reference signal generator 73 may be found in U.S. Pat. No. 3,535,041.

The two quadrature signals from the reference signal generator circuit 73 are supplied to the phase generator circuit 77 of FIG. 3 over lines 75. The 0° average component signal is supplied to a first inverting amplifier 99, one of the inputs to a first summing amplifier 101 and one of the inputs to a second summing amplifier 103. The 90° displaced average component signal is supplied to a second inverting amplifier 105, and the summing amplifier 101. The output of the inverting amplifier 105 is supplied to the other input of the summing amplifier 103. As a consequence, amplifier 99 generates a 180° displaced average component signal. Summing amplifier 101 generates a 45° displaced component signal. Amplifier 103 generates a 315° displaced average component signal and amplifier 105 generates a 270° displaced average component signal. The average component signals on lines 79 are supplied to the driving circuit 81 of FIG. 4 and are shown as waveforms A through F in FIG. 5.

The driving circuit 81, additionally receives command signals over lines 83 from appropriate command signal generating logic (not shown). The binary up-down counter 107 is a standard binary counter having a modulo sufficiently large to accommodate the many incremental steps that need to be taken in a Fourier interference spectrometer application, for example. The counter 107 receives reset command signals on line 83A from command control logic (not shown). The counter receives incrementing signals on line 116 from clock control logic 119. The signal on line 148 from up/down control logic 117 tells the counter 107 whether the signals on line 116 are to increment or decrement the counter 107. The up/down control logic 117 receives a step direction command on line 83B from command control logic (not shown). In addition, it receives a direction signal on line 124 from fringe direction detector logic 125. The up/down control logic 117 may simply be an exclusive OR circuit that supplies either the signal on line 83B or the signal on line 124 to the up/down counter 107 over lines 148 and insures that an overlap condition between the two does not hinder operation. In practice, the signals on line 83B would be occurring at times that the signals on line 124 are not occurring, and vice versa.

The clock control logic 119 receives step command signals on line 83C and distance to be moved signals on line 83D from command control logic (not shown). The clock control logic 119 also receives clock signals on line 120 from a standard clock source 121 and fringe occurrence signals on line 122 from a fringe detector 123. The clock control logic 119 supplies either the clock output signals on line 120 or the fringe detector signals on line 122, over line 116 to the up/down counter 107, the signals on the two lines 120, 122 being effectively ORed onto line 116. The step command signals on line 83C and the distance to be moved signals on line 83D are utilized in the clock control logic 119 to control the number of clock pulses that are passed to the up/down counter 107 over line 116. These pulses dictate the number of counts the up/down counter 107 is incremented or decremented.

The count in the up/down counter 107 is supplied over line 140, by way of min/max logic 109 and line 142 to a digital-to-analog (D/A) converter 111. The D/A converter 111 converts the binary count output of the up/down counter 107 to a relative voltage level on line 144. As a practical matter, the counter 107 will have a much higher internal count capability than the D/A converter 111 can respond to. The min/max logic 109 insures that the D/A does not modulo, by maintaining the D/A output at its maximum when the count of counter 107 is above a certain number, and keeping the D/A output at its minimum when the count of counter 107 is below a certain number.

The maximum count in the up/down counter 107 will cause the D/A converter 111 to produce a maximum voltage level on line 144. This voltage level is supplied to a differential amplifier 112. A constant voltage source 113 is connected to the other input of differential amplifier 112. The voltage level of this source is equal to exactly half the maximum voltage output that can be supplied by the D/A converter 111 on line 144. As a consequence, the output of differential amplifier 112, on line 146 is at a positive maximum when the up/down counter 107 is at the maximum limit, or greater, of logic 109 at a zero level when the up/down counter 107 is at a count equal to half its modulo, and at a maximum negative level when the up/down counter 107 is at the minimum limit, or less, of logic 109. It can thus be seen that with the up/down counter 107 set at a count equal to half its modulo, the voltage driving signal on line 146 is zero, thereby indicating a null state. The signal on line 146 is summed with a quarter wavelength voltage signal on line 138 in amplifier 115. The output of amplifier 115 on line 85 is supplied to the driving transducers of the retro-reflector 31 as shown in FIG. 1.

The sinusoidal waves 151, 153, 155, 157, 159 and 161 of FIG. 5 are received by the driving circuit 81 from the phase generation circuit 77 on line 79. The sinusoidal wave 151 is the interference pattern or fringe pattern generated by the reference laser beam 61 as detected by the reference photo detector 67. This pattern is utilized in the reference signal generation circuit 73 to produce a signal 155 that is 90° out of phase with it. These two signals, 151 and 155, are then supplied to the phase generation circuit 77 to additionally produce a fringe pattern that varies 180° from the base fringe pattern 151, another that varies 45°, another that varies 270°, and another that varies 315°. The fringe patterns 151, 155, 157 and 159 are displaced a quarter of a wavelength from each other. The 45° fringe pattern 153 occurs a plus 45° from the zero degree fringe pattern, while the 315° fringe pattern 161 occurs a negative 45° from the zero degree fringe pattern. This zero degree fringe pattern 151 can be thought of as defining the null position or positions of the moving retro-reflector 31 (FIG. 1).

The 45° wave 153 and 315° wave 161 fringe pattern is received by a pair of squaring circuits 127 and 129 respectively which square the sinusoidal waveforms to produce a square wave 163 in place of wave 153 and a square wave 165 for the sinusoidal wave 161 on lines 126 and 128 respectively. As can be seen from waveforms 163 and 165 the transitions, both negative and positive, occurring in these square waves in respect to each other differ by 90° and occur at 45° intervals, in other words, at a distance halfway between the quarter wavelengths of the fringe pattern 151.

The two square waves 163 and 165 are received by quadrant logic 131 which responds to these square waves by appropriately opening and closing switches 141, 143, 145, and 147 thereby gating through, respectively, a portion of the fringe waves A, C, D and E to line 138 and the input of amplifier 115. The quadrant logic 131 responds to the rising and falling transitions of the square waves 163 and 165 for example as follows. In response to the transition 163A on wave 163, quadrant logic 131 will generate a signal on line 134 which is amplified by amplifier 135 and applied to switch 143 causing that switch to close, thereby passing a portion of the 90° displaced fringe pattern to line 138 and the input of amplifier 115. At the occurrence of the falling edge 165A on square wave 165, the quadrant logic 131 responds be removing the control signal from line 134 and applying it to line 132. This causes switch 143 to open. This signal is passed through amplifier 137 to switch 145 causing it to close and pass a portion of the 180° displaced fringe pattern to line 138 and the input of amplifier 115. At the occurrence of the transition 163B of wave 163, the quadrant logic 131 responds thereto by removing the signal from line 132 and placing it on line 130. This signal is passed through amplifier 139 to switch 147 causing switch 147 to close and switch 145 to open. With the closure of switch 147 a portion of the 270° displaced fringe pattern is passed on to lines 138 and the input of amplifier 115. At the occurrence of the transition 165B of square wave 165 the quadrant logic 131 places a signal on line 136 and removes the signal from line 130. The signal on line 136 is amplified by amplifier 133 and passed to switch 141 causing switch 141 to close while switch 147 is opened. The closure of switch 141 passes the zero degree displaced fringe pattern onto line 138 and the input of amplifier 115. The occurrence of transition 163C of square wave 163 causes the quadrant logic 131 to remove the signal from line 136 and place it again on line 134, thereby opening switch 141 and closing switch 143. This causes the 90° displaced fringe pattern to be passed to the input of amplifier 115. The transition 165C causes the closure of switch 145 and the opening of switch 143 thereby passing the 180° displaced fringe pattern. As can be seen from waveform 167 each of the 0°, 90°, 180°, and 270° displaced fringe patterns are added to the output of the D/A converter 111 in amplifier 115 for a period of one quarter of the wavelength of the interference pattern 115 of the reference laser beam. This occurs when the retro-reflector is moved to within ¼ of the reference wavelength of its null position. The switching occurs half way between the quarter wavelength spacings of this reference pattern.

As can be seen from FIG. 6 the output of the differential amplifier on line 146 will appear as a staircase voltage 173. When the count of the up/down binary counter 107 is equal to ½ its modulo, because of the differential amplifier 112 and the voltage level 113 connected to its other input, the output of the amplifier 112 will equal zero at point 177. This indicates that the moving retro-reflector is within ¼ wavelength of a null position.

When the up/down counter 107 goes above its mid-modulo count, the output of the differential amplifier 112 on line 146 will appear as shown by the positive quadrant step wave 173 of FIG. 6. The up/down counter 107 can be either incremented or decremented according to the wave 173. If it is incremented, as the voltage increases according to the positive voltage axis 169, the optical path difference in the positive direction as defined by axis 171 also increases. As the voltage decreases, the optical path difference also decreases towards point 177 which is the last null point.

When the count in up/down counter 107 is below its mid-modulo count, the step wave 173 appears as shown in the third quadrant of FIG. 6. Thus, as the count is decreased from the mid-modulo count, the output of differential amplifier 112 on line 146 shows an increasing negative voltage as defined by axis 181 along with an increasing negative path difference as defined by axis 179. As the count is increased towards the mid-modulo count within counter 107, the voltage on line 146, the output of differential amplifier 112, will show a decreasing negative voltage along with a decreasing negative path difference as it approaches the null point 177.

The portions of the quarter wavelength segments of the reference fringe pattern that are switched into the input of amplifier 115, as above described and shown be waveform 167, are combined with the step waveform 173 at the appropriate times to provide a servo signal within a ¼ of the reference wavelength from a null point. As a reult of this summation, the output of amplifier 115 produces a driving signal 175 on line 85 that changes approximately linearly, thereby providing an extrememly accurate servo error and stepping signal. As a result of the servo loop of this invention, the linearity of the signal 175 on line 85 is greatly expanded in range, thereby permitting higher internal modulation with much higher amplitudes, which is necessary in certain applications of the interferometer spectrometer of FIG. 1.

The square waveforms 163 and 165, noted above, are also supplied over line 126, 128 to a fringe direction detector circuit 125 and a fringe occurrence detector 123. The fringe occurrence detector 123, for example, may simply be logic circuitry that detects the occurrence of the transitions of the waves 163 and 165. Thus, for example, each quarter wavelength of the reference fringe pattern can be detected by observing the occurrence of the transitions, such as 163A, in square wave 163 relative to the transition, such as 165A, in square wave 165. The fringe detector logic 123 thereby would generate a signal on line 112 that indicates a quarter wavelength change of the reference interference fringe pattern. This same signal is also supplied to a reversible counter 151 that could be identical to the up/down counter 107. The output of this reversible counter 151 on line 15 would indicate the relative optical path difference between the two retro-reflectors. A signal on line 83E to counter 151 resets the counter to its reference state.

In addition to being able to detect optical path difference changes to within a quarter wavelength of the reference light beam the direction of the change must also be known. The fringe direction detector 125 supplies this information. The direction logic 125 responds to the square wave signals 163 and 165 on lines 126 and 128 by generating a plus direction or minus direction signal on output line 124 to the up/down control logic 117 and the reversible counter 151. The fringe detector logic 125 is simple, well-known logic that responds to the occurrence sequence of the transitions in the square wave 163, 165. For example, if the path difference, as determined by the reference fringe pattern is increasing in the positive direction, the transitions of the square wave 163 would be occurring prior in time to the transitions of the square wave 165. If the path difference were increasing in the negative direction, then as can be seen from the waveforms 163, 165 the transitions of waveform 165 occur prior in time to the transitions of waveform 163.

In order to step the interferometer from one null position to another, the control logic (not shown) generates a step direction signal on line 83B, a step command signal on line 83C and an offset distance signal on line 83D. Assuming, for example, that the step direction signal on line 83B indicates a positive direction offset and the distance signal on line 83D indicates a distance equal to one and a quarter wavelengths of the reference laser, the clock control logic 119 will pass five clock pulses from clock source 121, on line 116 to the up-/down counter 107, causing that counter to increment in the plus direction by a count of five. In response thereto, the output of the differential amplifier 112 on line 146, will step up accordingly and the resultant driving signal on line 85 will increase linearly in a positive direction, as shown by wave 175 in FIG. 6.

Prior to receiving the up-count command, the up-/down counter 107 would most probably have been at its mid-modulo count. The driving signal would start building from the null point 177. As the voltage on line 85 causes the moving retro-reflector to respond by moving in the direction indicated, the fringe direction detector logic 125 and the fringe detector logic 123 will cause the up/down counter 107, by way of the up-/down control 117 and the clock control 119, the decrement each time a quarter wavelength to the fringe pattern is detected by the fringe detector logic 123. Thus, when the appropriate 1¼ wavelength distance has been reached the up/down counter 107 is again at its mid-modulo count producing a zero output voltage at line 146.

Assume now, that because of vibration or some other reason, the retro-reflector moves erratically from its desired null position. As a consequence, the direction of movement will be detected by the fringe direction detector logic 125 and the extent of movement will be detected by the fringe detector logic 123. Each quarter wavelength of such undesired movement causes the up/down counter 107 to either increment or decrement from its mid-modulo count. Assume for example, that the undesired movement is in the positive optical path difference direction. As a consequence, the up/down counter 107 will be appropriately decremented from its mid-modulo count according to the distance of the erratic movement, thereby generating an output voltage on line 85 that will cause the retro-reflector to be driven back to its null position. As this movement is induced by the driving signal on line 85, the fringe direction detector logic 125 and the fringe detector logic 123 again detects this counter-acting movement and cause the up/down counter 107 to increment back towards its mid-modulo count.

In the above described manner, a method and apparatus that produces a tight, closed-loop control for stepping a retro-reflector in an interferometer mechanism is obtained. Besides being able to permit much higher stepping speeds, the higher amplitude internal modulation required in certain spectrometry applications may now be implemented by use of the servosystem.

It should be understood, of course, that the foregoing disclosure relates only to preferred embodiments of the invention and that numerous modifications may be made therein without departing from the spirit or the scope of the invention as set forth in the appended claims.

What is claimed is:

1. Apparatus for precisely and rapidly changing the optical path difference in a stepping interferometer, having at least one moving retroreflector, wherein a reference light source, having a known wavelength, is utilized for the generation of a reference fringe pattern, said apparatus comprising means for applying an offset voltage to said moving retroreflector, said voltage being representative of a change in the optical path difference in said interferometer from a present null position to a new null position;

means for sensing said reference fringe pattern as a sinusoidal signal;

means responsive to said sensed sinusoidal signal for generating a voltage signal indicative of the degree of movement occurring in the optical path difference of said interferometer as a result of the applied offset voltage;

means for reducing said offset voltage according to the voltage signal generated by said sinusoidal signal responsive means;

means responsive to said sinusoidal signal for generating a plurality of sinusoidal signals displaced in phase by an even fractional portion of the sensed sinusoidal signal;

means responsive to less than all of said plurality of phase-displaced sinusoidal signals for generating a plurality of switching signals; and means responsive to said switching signals for sequentially passing selected portions of said plurality of phase-displaced sinusoidal signals to the input of said applying means, whereby said offset voltage is linearly reduced until the offset voltage is essentially zero when the new null position is reached.

2. The stepping apparatus of claim 1 wherein said applying means includes:

means for generating a step voltage; and means for summing the output of said step voltage generating means with the passed portion of said sinusoidal signals.

3. The stepping apparatus of claim 2 wherein said step voltage generating means, comprises:

a binary up/down counter;

a digital-to-analog converter connected to said counter and responsive to the count in said counter for generating a voltage in response thereto; and means for summing the output voltage of said digital-to-analog converter with a constant level voltage.

4. The stepping apparatus of claim 3 wherein said binary up/down counter responds to the output of said reference fringe pattern sensing means, and to step commands.

5. The stepping apparatus of claim 1 wherein said reference fringe pattern sensing means includes:

means for detecting whether the optical path difference is increasing or decreasing.

6. Apparatus for stepping the optical path difference in an interferometer, having at least one moving retroreflector, wherein a reference light source, having a known wavelength, is utilized for the generation of a reference fringe pattern, said apparatus comprising:

a binary up/down counter having a count direction input, a clocking input and an output;

a digital-to-analog converter connected to said counter output, said converter generating a voltage signal relative to the count in said binary counter;

means for sensing said reference fringe pattern as a sinusoidal signal;

means responsive to said sensed sinusoidal signal for changing the count in said binary counter according to the degree of movement occurring in the optical path difference in the interferometer;

means responsive to said sensed sinusoidal signal for supplying a signal indicative of the direction of change in the optical path difference in the interferometer to said binary counter to control the count direction therein;

means receiving step commands for clocking said binary counter;

means responsive to said sinusoidal signal for generating a plurality of sinusoidal signals displaced in phase by an even fractional portion of the sensed sinusoidal signal;

means responsive to less than all of said plurality of phase-displaced sinusoidal signals for generating a plurality of switching signals;

means responsive to said switching signals for sequentially passing selected portions of said plurality of phase-displaced sinusoidal signals; and means for combining the voltage signal from said digital-to-analog converter with the selected portions of the phase-displaced signals from said passing means to provide a linear varying drive signal for said moving retroreflector.

7. The stepping apparatus of claim 6, further comprising a differential amplifier having the output of said digital-to-analog converter connected to one of the inputs, a constant voltage level equal to ½ the maximum output voltage of said converter connected to another of the inputs, and the output connected to said combining means.

8. The stepping apparatus of claim 7, wherein said combining means comprises a summing amplifier.

* * * * *